United States Patent

[11] 3,629,541

| [72] | Inventors | James R. Mims<br>Acton;<br>Palmer P. Derby, Weston, both of Mass. |
|---|---|---|
| [21] | Appl. No. | 77,087 |
| [22] | Filed | Oct. 1, 1970 |
| [45] | Patented | Dec. 21, 1971 |
| [73] | Assignee | Raytheon Company<br>Lexington, Mass. |

[54] HAND-HELD SERIES WELDING TOOL
8 Claims, 7 Drawing Figs.

[52] U.S. Cl................................................. 219/78, 219/86
[51] Int. Cl.................................................. B23k 9/28
[50] Field of Search............................... 219/78, 86

[56] References Cited
UNITED STATES PATENTS

| 2,969,453 | 1/1961 | Page......................... | 219/86 |
| 2,727,122 | 12/1955 | Gartner..................... | 219/86 |
| 2,979,599 | 4/1961 | Width........................ | 219/161 X |
| 2,675,454 | 4/1954 | Warner..................... | 219/86 |
| 2,750,484 | 6/1956 | Ewald........................ | 219/86 |

*Primary Examiner*—R. F. Staubly
*Assistant Examiner*—Hugh D. Jaeger
*Attorneys*—Harold A. Murphy and Joseph D. Pannone ABSTRACT: A hand-held series welding tool which comprises a casing having two movable spaced electrodes interconnected by a pivot bar which transfers equalized forces from one electrode to the other, and switch means connecting the electrodes to a power supply for initiating a welding cycle when such forces reach a predetermined adjustable level.

3,629,541
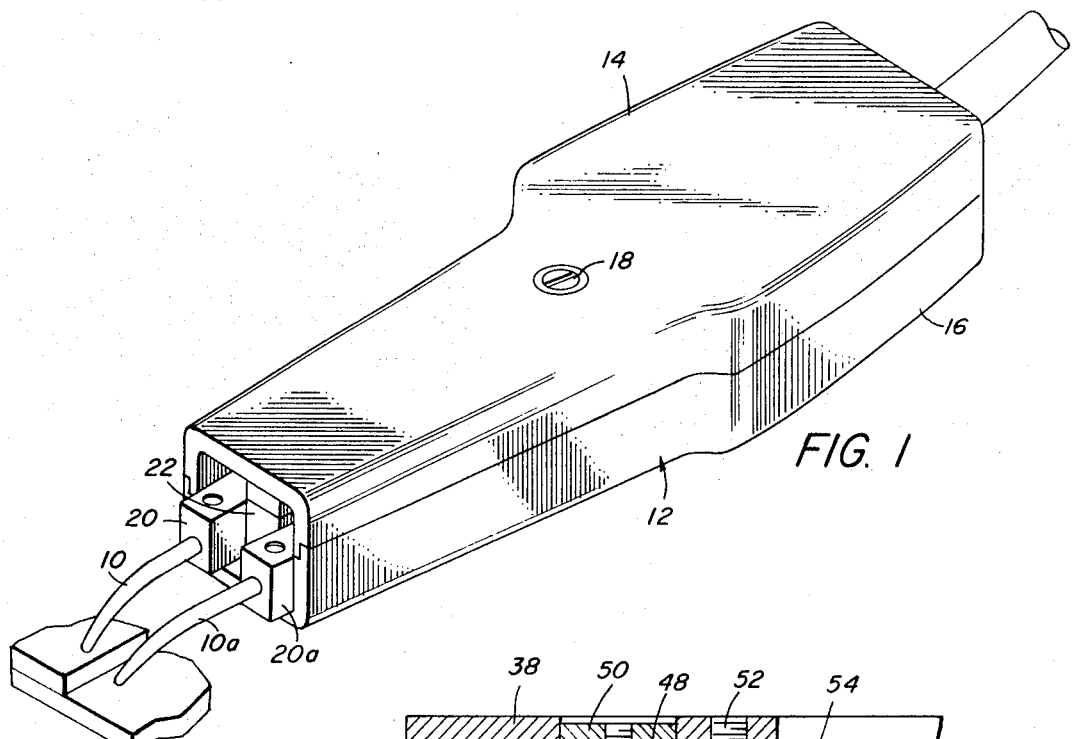
FIG. 1
FIG. 3
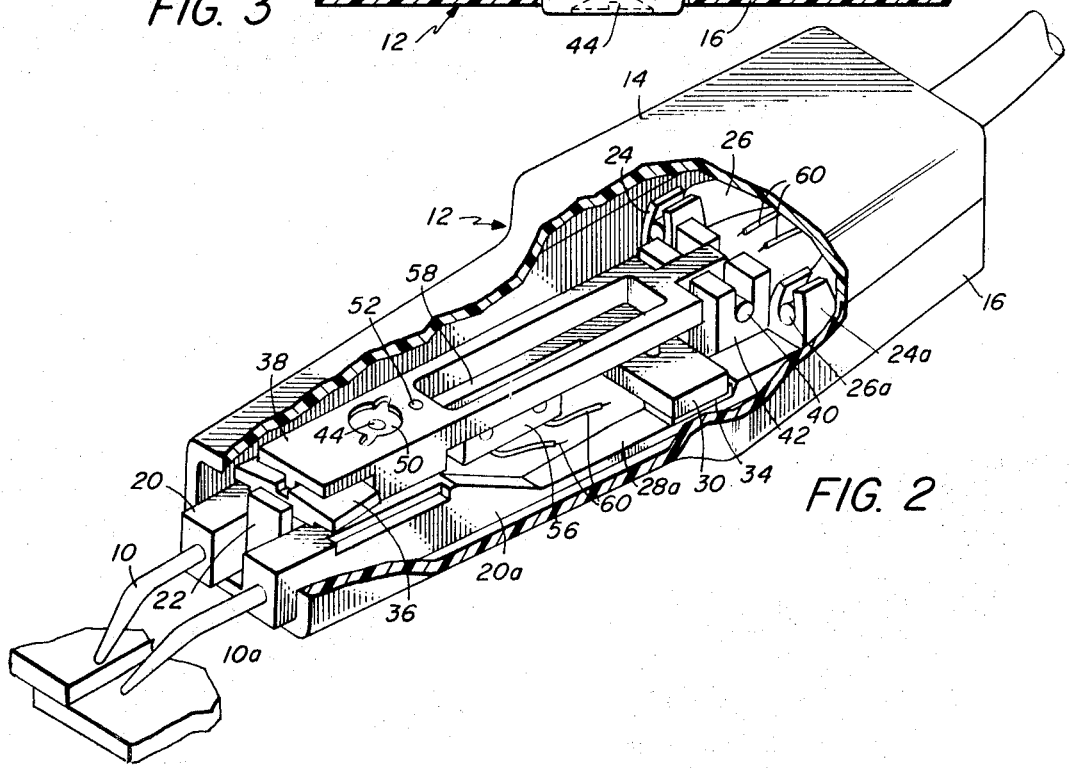
FIG. 2

3,629,541

HAND-HELD SERIES WELDING TOOL

BACKGROUND OF THE INVENTION

Known methods of welding have generally required the use of large bulky equipment or machinery which required that the parts to be welded be precisely aligned and supported with respect to the electrodes of the welding equipment. In such equipment problems frequently arose when the two parts being welded together were of different sizes, this requiring specifically designed and sometimes complicated mechanisms for permitting the machine to compensate for the differences. In fact, the some cases the welding electrodes were disposed on opposite sides of the work and this further complicated control of the electrodes.

A simplified method comprised laying a pair of conventional welding tweezers side by side on the parts to be welded and then manually pressing down the legs of the tweezers while the welder was fired. Such a method, however, lacks the desired precise control of pressure on the tweezers and is subject to the skill and manual dexterity of the operator to attempt to maintain a uniform total and individual contact force. Failure to do so results in poor welds.

SUMMARY OF THE INVENTION

The above and other disadvantages of prior art resistance welding apparatus are overcome by the present invention which comprises a hand-held device having a pair of flexible electrodes which are dielectrically interconnected by a force equalizer member which automatically transfers forces from one electrode to the other so that constant and equal pressures will be applied to the electrodes. In further accordance with this invention, there is provided a switch which is adapted to be operated in response to pressures upon the electrodes when the pressures or forces reach a predetermined level, and means is provided for adjusting the pressure level at which the switch operates so that the device will be capable of welding through thicknesses ranging from about 0.0005 inch to about 0.025 inch at forces varying from 1 to 15 pounds of welding pressure.

BRIEF DESCRIPTION OF THE DRAWINGS

FIG. 1 is an isometric view of a hand-held series welding tool embodying the invention;

FIG. 2 is a view similar to FIG. 1 showing a portion of the casing removed to disclose the operative parts therein;

FIG. 3 is an enlarged fragmentary axial sectional view through the tension adjustment means utilized in the device of FIG. 1;

DESCRIPTION OF THE PREFERRED EMBODIMENTS

Figure 4:
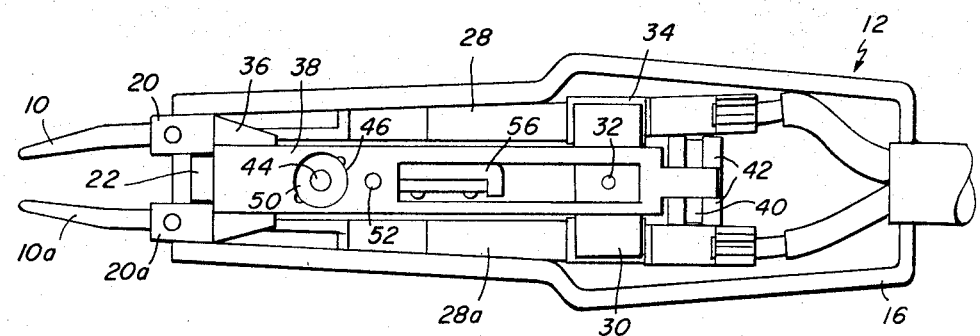
FIG. 4 is a top plan view of the device of FIG. 1 with the upper portion of the casing removed.
Figure 5:
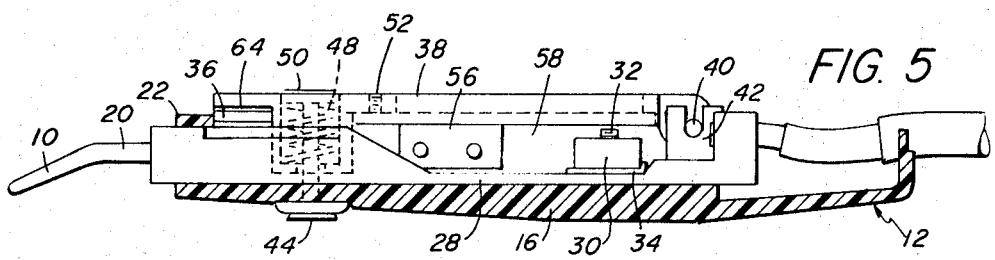
FIG. 5 is a side elevational view of the device shown in FIG. 4 with a sidewall of the case removed.

Referring more particularly to the drawings wherein like characters of reference designates like parts throughout the several views, the invention is illustrated in FIG. 1 as comprising a pair of electrodes 10 and 10a which project outwardly in spaced relation with one another from one end of a casing 12. The casing preferably comprises upper and lower portions 14 and 16 which are shaped suitably to interfit with one another along their adjoining edges and are interconnected in assembled relation by means such as a screw, bolt or the like 18.

The electrodes include the exposed prongs 10 and 10a which are preferably formed of chrome-copper or the like and which are mounted by one end thereof in one end of respective electrode supporting arms 20 and 20a which extend in spaced parallel relation longitudinally within the casing 12. The adjacent end of the casing is provided with an upwardly extending end portion 22 which is disposed between and properly spaces the arms 20 and 20a as shown in FIG. 2. Thus, when the upper casing portion 14 is assembled with the lower casing portion 16, the end portion 22 forms an end wall provided with two spaced apertures through which the electrode arms extend. As seen best in FIG. 1, however, the openings or apertures are larger than the cross-sectional sizes of the respective arms whereby the arms are permitted movement within the openings.

The inner ends of the arms terminate in contacts 24 and 24a respectively which are adapted to receive and to be clamped about adjacent ends of the cables 26 and 26a which extend out through the opposite end of the casing and are adapted to be connected to a suitable power supply for the purpose of providing welding current to the electrodes.

In accordance with an important feature of this invention, the electrode supporting arms 20 and 20a are each provided with a relatively thin cross-sectional portion 28 and 28a respectively which enable the arms to be flexed. So that flexure is achieved, the arms are preferably made of a material such as beryllium-copper. The arms are fastened securely to the bottom portion 16 of the casing by means of a crossbar 30 which is suitably secured as by a bolt 32 to the casing. Suitable insulation 34 is disposed between crossbar 30 and arms 20–20a. Thus, it will be apparent that movement of the electrodes 10 and 10a such as by forceful contact with parts to be welded, for example, will cause consequent movement of the adjacent portion of the arms 20 and 20a by virtue of the flexure permitted by the portions 28 and 28a.

Another important feature of the invention resides in the fact that forces applied to one of the electrodes 10 or 10a, such as occur when the device is brought into engagement with one or more members to be welded, will be transferred equally to the other electrode so that pressure or force bearing upon the articles being welded will be equalized at each of the electrode tips. This is achieved by a dielectric pivot bar 36 which is mounted in spanning relation across the tops of the electrode supporting arms 20–20a immediately behind the casing end portion 22. Overlying the pivot bar 36 is one end of a pivot arm 38 which has its opposite end pivotally mounted as by a pivot pin or fulcrum 40 in a suitable bearing structure 42 which formed integrally in the base of the bottom casing portion 16.

The bottom of the casing is apertured to receive a bolt 44 which extends upwardly into a cavity 46 formed in the upper surface of the pivot arm 38. Disposed around bolt 44 and within the cavity 46 is a tension spring 48 which is retained within the cavity 46 by a nut 50 on the end of the bolt 44. The spring has a predetermined tension and is arranged to constantly urge the pivot arm downwardly toward the bottom wall of the lower casing portion 16. Thus, forces exerted upon one or both of the electrodes will, through pivot bar 36, cause upward movement of the adjacent end of the pivot arm 38 against the tension spring 48, such movement of the pivot arm, of course, occurring about the axis of the fulcrum 46.

The pivot arm 38 is provided with an adjustable set screw 52 which extends downwardly through the pivot arm into engagement with the operating member 54 of a microswitch 56 which is affixed to an extension 58 of the crossbar 30. The microswitch 56 is, therefore, fixedly mounted and is suitably connected to an electrical circuit as by leads 60 (FIG. 2) which extend outwardly through the casing with cables 26 and 26a. Therefore, the microswitch, which in a preferred embodiment is normally closed, will be operated when the pivot arm is raised sufficiently to allow the set screw 52 and lead spring 54 to close the contact of the switch. It will be apparent that the tension of spring 48 may be suitably adjusted by manipulation of the nut and bolt therein so that the switch will precisely operated in response to the forces applied to the electrodes. A single spring may be inherently tensioned or adjusted to provide operation of the switch at a predetermined force of from 1 to 15 pounds welding pressure, for example, or several springs may be substituted for one another to control the operation of the switch in accordance with a selected known welding pressure. Thus, parts having an assembled thickness of from 0.0005 inch to 0.025 inch, for example, may be efficiently welded by this device.

Figure 6:
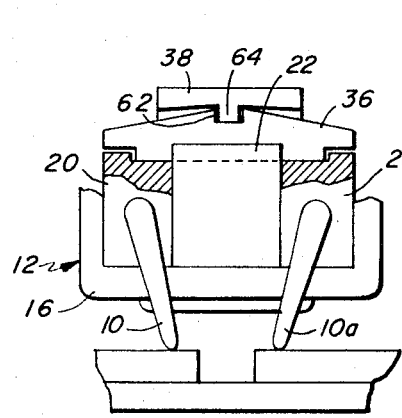
FIGS. 6 and 7 are end views of the device illustrating the device in two positions of use.
Figure 7:
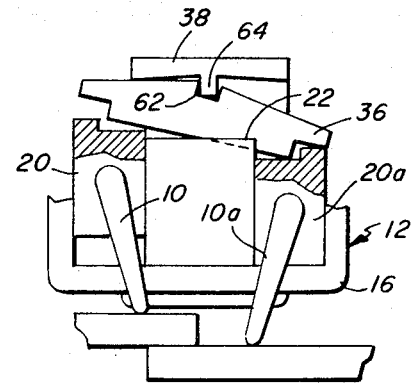

Another problem relating to prior art welding devices occurs when the electrodes 10 and 10a must engage two surfaces at different levels and must maintain equalized welding pressure upon both electrodes. This is achieved by the pivot bar 36 which is provided in its upper surface with a longitudinally extending groove 62 (FIG. 7), which groove is adapted to be engaged by a downwardly extending ridge 64 on the underside of the pivot arm 38. Thus, when the electrodes 10 and 10a are disposed at different levels, as shown in FIG. 7, the consequent forces applied to the higher electrode will cause consequent pivotal movement of the pivot bar 36 as shown, thus applying equalized pressure to the lower electrode 10a. Where the electrodes are maintained at substantially the same levels as shown in FIG. 6, such pivotal action to equalize forces on the electrodes does not occur.

This device has proven to be particularly efficient since welding is often done by applying electrodes to surfaces disposed at different levels. If forces were not equalized, a resulting weld will be poor.

In accordance with the objectives set forth hereinabove, there has been provided an efficient hand held series welding tool which provides equalized pressure welding forces to be applied to the welding electrodes regardless of the levels at which the electrodes are disposed, and switch means which is operable in response to varying welding pressures for operation of the device. These and other features of the invention will be apparent to those skilled in the art. It will be understood that various modifications and changes may be made, however, within the scope of the appended claims. Therefore, all matter shown and described is to be interpreted as illustrative and not in a limiting sense.

We claim:

1. A welding tool comprising a casing, a pair of elongated electrode supports extending in spaced relation within the casing, electrodes extending from one end of each of the respective supports and having effective welding tips external to the casing, said supports and electrodes being normally positioned in a common plane, each of said electrodes and adjacent portions of the respective supports being individually movable out of said plane and toward and away from a common side of the work to be welded, and pivotal means operatively connected to said supports and pivotally movable in a plane perpendicular to said first plane for equalizing pressure forces between the electrodes in response to pressure upon one or both of the electrodes.

2. A welding tool comprising a casing, a pair of elongated electrode supports extending in space relation within the casing, electrodes extending from one end of each of the respective supports and having effective welding tips external to the casing, the electrodes and adjacent portions of the supports being movable toward and away from a common side of the work to be welded, and means for equalizing pressure forces between the electrodes, said means comprising a member disposed in spanning relation to said movable portions of the supports, and a restraining arm extending longitudinally of the device, one end of the arm engaging said member and the other end being pivotally anchored within the casing.

3. A welding tool as set forth in claim 2 wherein said member has one surface in engagement with said supports and has means in its opposite surface interfitting with means on the adjacent surface of the restraining arm whereby movement of one support with respect to the other in a direction away from said work will cause pivotal action of said member whereby forces applied to said one support through its respective electrode will be applied to the other support and its respective electrode.

4. A welding tool as set forth in claim 3 wherein switch means is located in said casing, and leads are attached to said switch means for connecting the switch means to circuitry external of the casing, and said switch means is operable in response to pressure forces exerted upon the electrodes.

5. A welding tool as set forth in claim 4 wherein said switch means is fixedly mounted in the casing, and said restraining arm is provided with means for engaging and operating the switch means upon movement of the arm in response to pressure forces applied to the electrodes.

6. A welding tool as set forth in claim 5 wherein means is provided for restraining movement of the restraining arm and for thereby controlling the operation of the switch means.

7. A welding tool as set forth in claim 6 wherein said means for restraining movement of the arm comprises a spring connected to the arm and anchored to the casing whereby movement of the arm is accomplished against the tension of the spring.

8. A welding tool as set forth in claim 7 wherein means is provided for adjusting said spring and consequently varying the forces applied to said arm whereby the operation of said switch means is controlled.

* * * * *